June 8, 1937.  W. M. WHITE  2,082,927
HYDRAULIC TURBINE
Filed Sept. 23, 1935
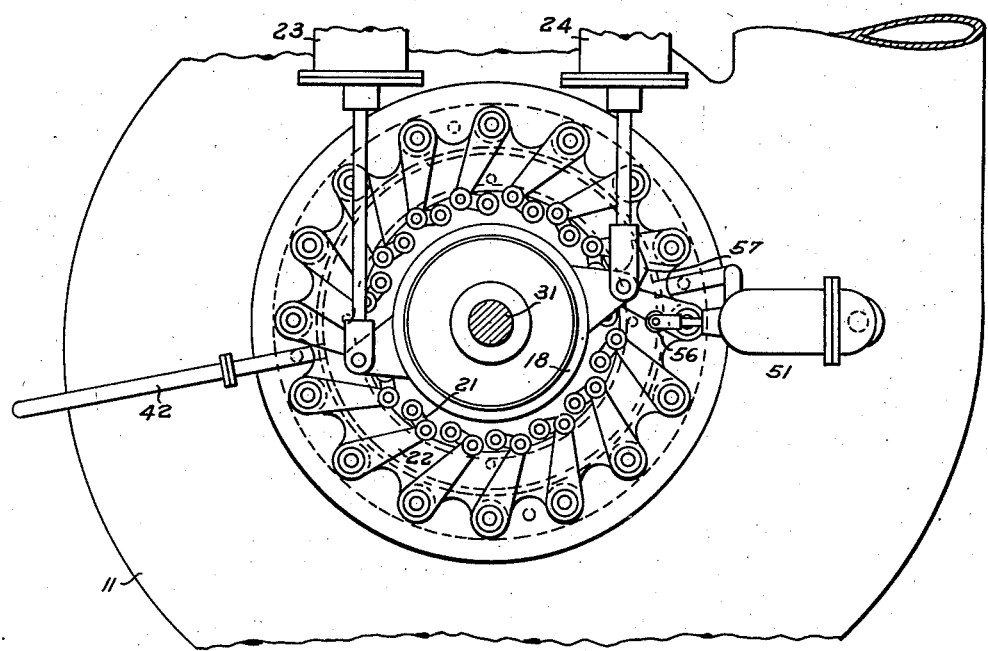
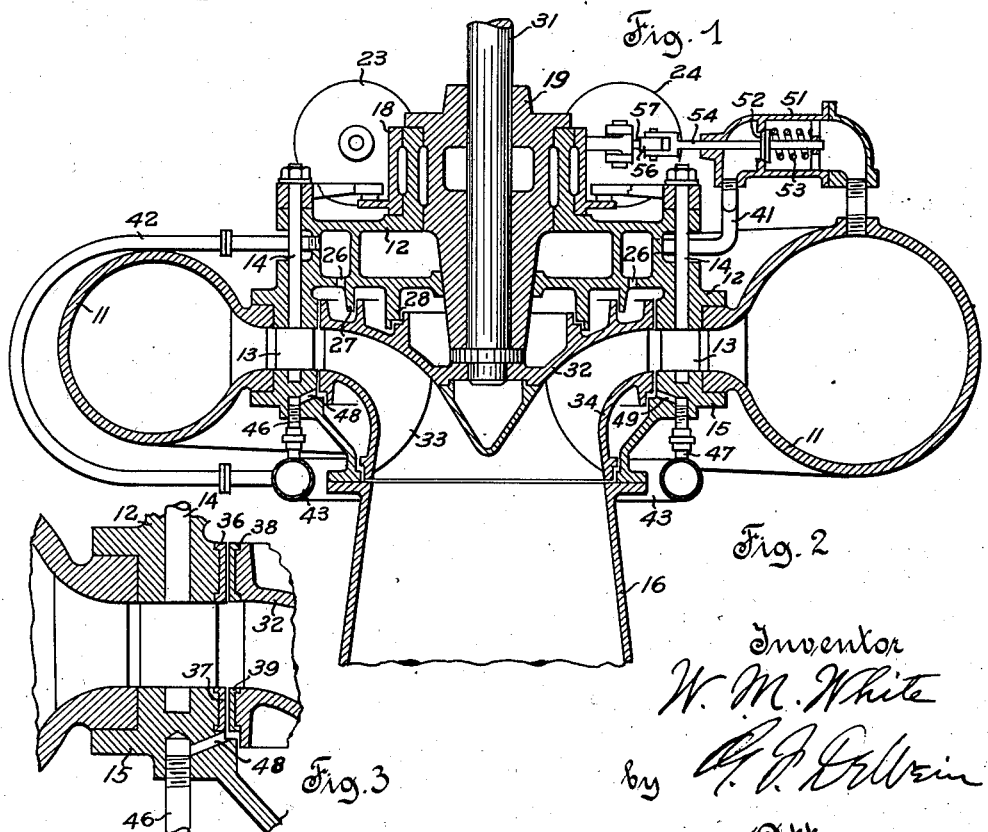

Patented June 8, 1937

2,082,927

UNITED STATES PATENT OFFICE 2,082,927

HYDRAULIC TURBINE

William M. White, Milwaukee, Wis.

Application September 23, 1935, Serial No. 41,732

11 Claims. (Cl. 253—117)

This invention relates to improvements in hydraulic turbines of the reaction type and more particularly to means for securing proper cooling and lubrication of the portions of the turbine structure which rotate relative to each other at small clearances.

Hydraulic turbines of the reaction type are made with as small clearances as is practical between the runner and the stationary portions adjacent the runner and forming the casing. Such clearances are usually of the order of $\frac{1}{32}$ to $\frac{1}{64}$ inch to thereby diminish leakage of water through such spaces and thus to increase the efficiency of the turbine. During normal operation of the turbine when the turbine is producing power, such spaces are filled with water under pressure which lubricates and cools the surfaces of the adjacent portions. As long as the turbine is new and the bearings are in good condition and in exact adjustment, the clearances are maintained and the adjacent portions should not come into contact even when no water is passing through the turbine. It has been found however that such exact adjustment is practically impossible to obtain and that the adjacent surfaces contact with each other thus causing friction which produces heat which expands the different portions of the turbine. It is possible therefore and has frequently happened that the adjacent surfaces of the rotating and stationary portions seize and cause damage thereto.

Rotation of the turbine by the generator with no water passing through the turbine is also frequently desired in extensive power systems to utilize the inductive capacity of the generator as a synchronous condenser for the purpose of improving the power factor of the power transmission line. When the generator is operated as a synchronous condenser, the turbine gates are closed and it is usually required that the shutoff means in the penstock also be closed to avoid wastage of water and to prevent the accumulation of a mass of water in the turbine which is merely whirled around therein and thus reduces the effectiveness of the generator as a synchronous condenser.

Even when the turbine is new and particularly when the turbine is acting as a synchronous condenser, when no water is passing through the turbine, contact is frequently established between the adjacent portions thereof as above stated and heating due to friction begins. Due to the greater mass of the casing portion, the heat is conducted away from the stationary portions at such rate as to minimize the expansion thereof. The runner however is unable to dissipate the heat produced therein at the same rate as is possible for the casing and the runner therefore expands at a greater rate than the rate of expansion of the casing unless suitable means are provided to cool the portions of the turbine in which the heat is generated. The final result is that the clearance between the rotating and stationary members is reduced and that the adjacent portions finally lock together. The effect of such locking will be readily appreciated when the flywheel effect of the rotating parts of the turbine and of the generator and the linear peripheral speed of the runner relative to the stator is considered. Such locking has been known to tear strips out of the steel castings of which the turbine is usually constructed. The spaces between the rotating and stationary portions of a turbine should therefore be cooled and lubricated by some means operating automatically in response either to closure of the turbine gate or to closure of the shutoff device in the penstock.

It is therefore among the objects of the present invention to provide means for cooling and lubricating the small clearance spaces between the rotating and stationary portions of a hydraulic turbine when the turbine is rotating without producing power.

Another object of the invention is to provide for the supply of water between the wearing rings of a hydraulic turbine when the operating supply to the turbine is fully or partially shut off.

Another object of the invention is to provide means for cooling and lubricating the closely adjacent rotating and stationary portions of a hydraulic turbine automatically upon complete closure of the pipe line supplying water thereto.

Objects and advantages other than those above set forth will be apparent from the following description when read in connection with the accompanying drawing, in which:

Fig. 1 is a partial top plan view of a hydraulic turbine of the reaction type, partially illustrating the spiral casing thereof and illustrating a connection with such casing by which water is taken therefrom for supplying the close clearance spaces of the turbine;

Fig. 2 is a partial vertical sectional view of a hydraulic turbine provided with means for automatically supplying water between closely adjacent rotating and stationary portions of the turbine, from the spiral casing thereof upon closure of the gates controlling the supply of operating water to the turbine; and Fig. 3 is an enlarged view of a portion of the turbine construction illustrating a preferred construction of the wearing rings applied to the adjacent rotating and stationary portions of the turbine.

Referring more particularly to the drawing by characters of reference, the reference numeral 11 designates a spiral casing which is to be connected through a penstock (not shown) with a suitable source of water supply. The spiral casing is connected with a circular structure 12 which forms the so-called cover plate and with a so-called discharge ring 15 between which movable vanes 13 are mounted on stems 14. The vanes 13 are operable by means to be hereinafter described, to be adjusted to control or to shut off the flow of fluid from the spiral casing into the turbine. The discharge ring 15 is connected with a draft tube 16 of the turbine. The cover plate 12 is substantially annular and has a flange about the central aperture therethrough which forms a support for a ring 18 for shifting the position of the guide vanes forming the turbine gate and which also supports a bearing structure 19. The shifting ring 18 is connected through a link 21 and an arm 22 (see Fig. 1) with each gate vane 13 and is operated by servomotors 23 and 24 connected therewith as is well known. The cover plate 12 is preferably made double walled with apertures 26 in the bottom thereof and flanges 27 and 28, extending downward therefrom, both apertures and flanges being for a purpose which will appear hereinafter.

A shaft 31 extends through the bearing 19 to connect the turbine motor with the driven mechanism (not shown). The turbine rotor shown is of the reaction type and accordingly comprises a substantially frusto-conical top plate 32 having blades 33 secured thereto or formed integral therewith as may be desired. The lower ends of the blades are connected by a discharge band 34. It will be seen in Fig. 3 that the inner periphery of both the cover plate 12 and the discharge ring 15 are preferably provided with special separate wearing rings 36 and 37 respectively which are preferably made in such manner as to be readily removable and replaceable. The runner top plate 32 and the discharge band 34 are also each provided with special wearing rings 38 and 39 respectively. Due to the provision of such special rings, the material of the rings may be chosen for any desired characteristics and need not have the same properties as the material of which the remainder of the turbine is made.

The spiral casing 11 is connected through a valve, to be specifically described hereinafter, with the space within the double walls of the cover plate 12 by way of conduit 41. Such space is likewise connected by conduit 42 with a header 43 arranged below the discharge ring 15. It will thus be seen that the cover plate performs the function of a conduit connecting conduits 41 and 42 to provide a continuous passageway for the water from the spiral casing to the spaces between the portions of the turbine to be cooled and lubricated. It will be understood that the conduit 41 is actually to be connected with the penstock beyond the usual shut off means therein (not shown) to insure a source of water supply even when the spiral casing is drained, the connection with the spiral casing being shown herein merely for purposes of explanation of the operation of the invention disclosed. The header 43 is connected at a plurality of points such as 46, 47 etc. with passageways 48, 49 etc. extending through the speed ring and connecting with the space between the wearing rings 37 and 38. Flow of fluid through conduits 41 and 42 is controlled by a valve which comprises a casing 51 containing a valve member 52 urged against its seat by a spring 53. The stem 54 of the valve 52 extends outside of casing 51 and carries a roller 56 and the roller engages a cam 57 mounted upon and operable with the shifting ring 18. The degree of opening of the valve is directly dependent on the curve of the cam which may be designed to keep the valve open as long as the quantity of water passing through the turbine, when in operation, is not sufficient to provide adequate cooling and lubrication of the closely adjacent portion of the turbine.

When the turbine is in operation with the gate open, the shifting ring 18 is in such position that the cam 57 is out of contact with the roller 56. The spring 53 then forces the valve 52 on its seat and flow of water through the conduits 41 etc. is interrupted. As soon as the turbine gate begins to close and the shifting ring 18 has therefore begun to rotate, the cam 57 is rocked into contact with roller 56. Continued closure of the gate forces the cam 57 against the roller 56 and opens the valve 52 against the compression of the spring 53 at a rate determined by the curvature of the cam. Water then flows through the conduit 41 into the double walled spaces inclosed by the cover plate 12. A portion of the water is discharged therefrom through the apertures 26 and flows between the rings 36 and 38 through the turbine. The remainder of the water flows from the cover plate through the conduit 42 into the header 43 from which it is distributed through connections 46, 47 etc. and passages 48, 49 etc. between the rings 37 and 39 from which it is discharged into the draft tube. The turbine is thus provided with means for supplying cooling and lubricating fluid between the close clearance spaces between the rotating and stationary portions of the turbine when the turbine is not in power producing operation and such means include means for controlling the flow of the cooling and lubricating fluid responsive to movement of a portion of the turbine structure movable in direct relation to the quantity of water flowing through the turbine.

Although but one embodiment of the present invention has been illustrated and described, it will be apparent to those skilled in the art that various changes and modifications may be made therein without departing from the spirit of the invention as defined by the scope of the appended claims.

It is claimed and desired to secure by Letters Patent:

1. In a hydraulic turbine installation having adjacent rotating and stationary portions, a source of hydraulic pressure supplying the turbine, means for controlling the connection of the turbine with said source, and means for connecting said source with the spaces between the adjacent rotating and stationary portions of the turbine to supply hydraulic pressure to such spaces for cooling the several portions thereof and operable responsive to movement of the first said means to control connection of the second said means.

2. In a hydraulic turbine installation having closely adjacent rotating and stationary portions, a source of hydraulic pressure supplying the turbine, movable vanes associated with the turbine and forming a gate for controlling the connection of the turbine with said source, means for connecting said source with the spaces between the adjacent rotating and stationary portions of the turbine to supply hydraulic pressure to such spaces to cool and lubricate the several portions thereof, and means operable responsive to closing movement of said vanes to control connection of the first said means.

3. In a hydraulic turbine installation having closely adjacent rotating and stationary portions, a source of hydraulic pressure supplying the turbine, means for controlling the connection of the turbine with said source, conduits for connecting said source with the spaces between the adjacent rotating and stationary portions of the turbine to supply hydraulic pressure to such spaces to cool and lubricate the several portions thereof, and means operable responsive only to closing movement of the first said means to control connection of said conduits.

4. In a hydraulic turbine installation having adjacent rotating and stationary portions, a source of hydraulic pressure supplying the turbine, means for controlling the connection of the turbine with said source, means for connecting said source with the spaces between the adjacent rotating and stationary portions of the turbine to supply hydraulic pressure to such spaces to cool the several portions thereof, and a valve opened upon closing movement of the first said means to control the connection of the second said means.

5. In a hydraulic turbine installation having adjacent rotating and stationary portions, a source of hydraulic pressure supplying the turbine, means for controlling the connection of the turbine with said source, conduits for connecting said source with the spaces between the adjacent rotating and stationary portions of the turbine to supply hydraulic pressure to such spaces to cool the several portions thereof, and a valve opened only upon closing movement of said means to control connection of said conduits.

6. In a hydraulic turbine installation having adjacent rotating and stationary portions, a source of hydraulic pressure supplying the turbine, movable vanes associated with the turbine and forming a gate for controlling the connection of the turbine with said source, conduits for connecting said source with the spaces between the adjacent rotating and stationary portions of the turbine to supply hydraulic pressure to such spaces to lubricate the several portions thereof, and a valve operable responsive only upon closing movement of said gate to control connection of said conduits.

7. In a hydraulic turbine installation having adjacent rotating and stationary portions, a source of hydraulic pressure supplying the turbine, means for controlling the connection of the turbine with said source, means for connecting said source with the spaces between the adjacent rotating and stationary portions of the turbine to supply hydraulic pressure to such spaces to cool the several portions thereof, a spring pressed valve biased in closed position and controlling the connection of the second said means, and means connecting said valve with the first said means to open said valve only when connection with said source of hydraulic pressure is being interrupted.

8. In a hydraulic turbine installation having closely adjacent rotating and stationary portions, a source of hydraulic pressure supplying the turbine, means for controlling the connection of the turbine with said source, means for connecting said source with the spaces between the adjacent rotating and stationary portions of the turbine to supply hydraulic pressure to such spaces to cool and lubricate the several portions thereof, a spring pressed valve biased in closed position and controlling the connection of the second said means, a roller mounted on the stem of said valve, a cam mounted on the first said means for operation thereby and engaging said roller to open said valve against the action of said spring only when connection with said source of hydraulic pressure is being interrupted.

9. In a hydraulic turbine installation having close clearances between adjacent rotating and stationary portions thereof, separate rings mounted on adjacent surfaces of the adjacent portions, a source of hydraulic pressure, means for controlling connection of the turbine with said source, means for connecting said source with the spaces between the adjacent portions, and means operable responsive to movement of the first said means to control connection of the second said means.

10. In a hydraulic turbine installation having close clearances between adjacent rotating and stationary portions thereof, separate rings mounted on adjacent surfaces of the said adjacent portions, a source of hydraulic pressure supplying the turbine, means for controlling connection of the turbine with said source, conduits connecting said source with the spaces between the adjacent portions, and a valve operable responsive to the movement of the first said means to control connection of said conduits.

11. In a hydraulic turbine installation having close clearances between adjacent rotating and stationary portions thereof, separate rings mounted on adjacent surfaces of the said adjacent portions, a source of hydraulic pressure supplying the turbine, means for controlling connection of the turbine with said source, conduits for connecting said source with the spaces between the said adjacent portions of the turbine, a spring pressed valve biased in closed position and controlling the connection of said conduits, and means operating said valve from the first said means to open said valve.

WILLIAM M. WHITE.